United States Patent [19]

Yajima

[11] Patent Number: 5,068,635
[45] Date of Patent: Nov. 26, 1991

[54] STRESS SENSOR HAVING DEFORMABLE CERAMIC HOLLOW MEMBER

[75] Inventor: Yasuhito Yajima, Nagoya, Japan

[73] Assignee: NGK Insulators, LTD., Japan

[21] Appl. No.: 382,588

[22] Filed: Jul. 20, 1989

[30] Foreign Application Priority Data

Jul. 27, 1988 [JP] Japan .................. 63-187173

[51] Int. Cl.$^5$ .................................... H01C 10/10
[52] U.S. Cl. ........................... 338/42; 338/4; 338/36
[58] Field of Search ............. 338/42, 47, 48, 2, 4, 338/5, 36

[56] References Cited

U.S. PATENT DOCUMENTS

| | | | |
|---|---|---|---|
| 2,488,347 | 11/1949 | Thurston | 338/47 X |
| 2,561,318 | 7/1951 | Ruge | 338/47 X |
| 4,051,451 | 9/1977 | Kurtz et al. | 338/42 |
| 4,127,840 | 11/1978 | House | 338/42 X |
| 4,311,980 | 1/1982 | Prudenziati | 338/4 |
| 4,576,049 | 3/1986 | Köhnlechner | 338/42 X |
| 4,916,426 | 4/1990 | Yajima et al. | 338/42 X |

OTHER PUBLICATIONS

"Low Cost Thick-Film Pressure Sensor", *Society of Automotive Enginers, Inc.*, Article 800023, 1980, by A. Cattaneo et al., pp. 49-54.
"Characteristics and Performances of Thick Film Pressure Sensors for Automotive Sensors for Automotive Applications", SAE, Article 820139, Dell'Acqua et al.
"High Pressure Thick Film Monolithic Sensors", SAE, Article 860474, Dell'Acqua et al., pp. 79-87.

*Primary Examiner*—Marvin M. Lateef
*Attorney, Agent, or Firm*—Parkhurst, Wendel & Rossi

[57] ABSTRACT

A stress sensor for detecting a stress, including a ceramic hollow member, a pair of support members for supporting the ceramic hollow member, and at least one resistor provided on the ceramic hollow member. The ceramic hollow member is deformable according to a stress applied thereto in a direction in which a hollow of the hollow member extends. The support members are disposed at opposite ends of the hollow member, so as to support the hollow member such that the stress is imparted to the hollow member through the pair of support members. The resistor or resistors is/are disposed on one of the inner and outer surfaces of the hollow member. The stress is detected based on a change in the electrical resistance value of the resistor or resistors which is caused by the deformation of the hollow member.

21 Claims, 7 Drawing Sheets

STRESS SENSOR HAVING DEFORMABLE CERAMIC HOLLOW MEMBER

BACKGROUND OF THE INVENTION

1. Field of the Invention

The present invention relates generally to a stress sensor, and more particularly to a stress sensor having a ceramic substrate and at least one resistor disposed on the ceramic substrate, for detecting the amount of deformation of the ceramic substrate, based on a change in the electrical resistance of the resistor or resistors which is caused by the deformation, and thereby sensing the amount of a stress which has caused the deformation.

2. Discussion of the Prior Art

There is known a stress sensor wherein at least one resistor is disposed on a substrate in the form of a diaphragm. In this stress sensor, the amount of a stress which causes deflection of the diaphragm substrate is detected depending upon the amount of change in the electrical resistance of the resistor or resistors which is caused by the deflection of the diaphragm. Recently, the use of a ceramic diaphragm rather than a metallic diaphragm is proposed as the substrate for such type of stress sensor, because of higher durability of the ceramic diaphragm in high-temperature atmospheres. An example of the ceramic substrate is disclosed in U.S. Pat. No. 4,311,980 (laid-open Publication No. 62-12458 of examined Japanese Patent Application).

Where the known stress sensor using a ceramic diaphragm as the substrate is used for detecting a pressure, the ceramic diaphragm substrate is exposed at one surface thereof directly to a subject atmosphere in the external space. The ceramic substrate undesirably undergoes a certain amount of deflection if the substrate is exposed to a sudden change in the temperature of the subject atmosphere. For example, when the sensor is used to detect the combustion pressure of an atmosphere within a cylinder of an internal combustion engine, the temperature of the atmosphere changes to a considerable extent. The deflection of the ceramic substrate due to the temperature change of the subject atmosphere results in an undesirable error in the output value of the sensor.

Described more specifically, the ceramic diaphragm used as the substrate of the known pressure sensor for sensing the combustion pressure in an internal combustion engine is exposed directly to a combustion gas produced in the combustion stroke of the engine, and to an air-fuel mixture in the suction stroke. The alternate exposure of the ceramic diaphragm to the hot combustion gas and the cool suction mixture occurs at an extremely short cycle time, whereby the ceramic diaphragm is alternately heated and cooled in a periodic fashion at a very high frequency. As a result, there is developed a temperature difference between the opposite sides of the ceramic diaphragm, whereby a thermal stress is induced in the ceramic diaphragm, and the diaphragm tends to undergo undesirable deflection. The deflection of the diaphragm due to the thermal stress influences the resistance value of the resistor or resistors provided on the diaphragm. Therefore, the output value of the pressure sensor includes an error which is equivalent to the amount of change in the resistance of the resistor or resistors which is caused by the deflection of the diaphragm due to the thermal stress.

SUMMARY OF THE INVENTION

The present invention was made in view of the problem experienced in the prior art as described above. It is accordingly an object of the present invention to provide a stress sensor using a ceramic substrate for supporting at least one resistor, which sensor is operable in comparatively high temperature atmospheres and is capable of effecting highly accurate detection of a stress, without an excessive amount of thermal stress and consequent deflection of the ceramic substrate even under operating environments in which the temperature of the subject atmosphere suddenly changes to a considerable extent.

The above object may be achieved according to the principle of the present invention, which provides a stress sensor for detecting a stress, comprising: (a) a ceramic hollow member having an inner and an outer surface and a hollow defined by the inner surface, the ceramic hollow member being deformable according to a stress applied thereto in a direction in which the hollow extends; (b) a pair of support members which are disposed at opposite ends of the ceramic hollow member, so as to support the ceramic hollow member in the above-indicated direction such that the stress is imparted to the ceramic hollow member through the pair of support members; and (c) at least one resistor provided on at least one of the inner and outer surfaces of the ceramic hollow member. An electrical resistance value of the at least one resistor varies with an amount of deformation of the ceramic hollow member, whereby the stress is detected based on a change in the electrical resistance value of the at least one resistor.

In the stress sensor of the present invention constructed as described above, the resistor or resistors is/are provided on the hollow member which is made of a ceramic material having a comparatively high resistance to heat. Therefore, the sensor can be used to detect a stress under an atmosphere having a comparatively high temperature. More specifically, the ceramic hollow member undergoes compressive deformation in the direction in which the hollow extends, due to the stress applied thereto, whereby the electrical resistance value of the resistor or resistors varies in response to the compressive deformation of the ceramic hollow member. Thus, the stress can be detected or determined by a change in the electrical resistance of the resistor or resistors.

The stress is imparted to the ceramic hollow member through the pair of support members. In other words, the ceramic hollow member which serves as a substrate for bearing the resistor or resistors is not exposed directly to a subject atmosphere, whose temperature may suddenly change to a considerable extent. When the stress sensor is used to detect the combustion pressure in an internal combustion engine, for instance, the temperature of the atmosphere within the engine periodically changes by a considerable amount at a relatively high frequency. However, the ceramic hollow member is protected by the support members from direct exposure to such a temperature change of the subject atmosphere, and is thus protected against thermal stress due to a temperature difference which would be otherwise caused by the direct exposure to the subject atmosphere. Accordingly, the present stress sensor assures accurate detection of the stress such as a pressure, without a significantly reduced influence of such thermal stress that causes undesirable deformation of the ceramic hollow member, which results in an error of detection of the subject stress.

Further, the ceramic hollow member undergoes only compressive deformation in the direction of extension of the hollow, by the stress imparted to the hollow member in the same direction. That is, the ceramic hollow member does not undergo tensile deformation as encountered on a ceramic substrate in the form of a diaphragm used in the known stress sensor. Consequently, the present stress sensor has considerably improved durability as compared with the known stress sensor using the ceramic diaphragm substrate. Namely, the present stress sensor may be used for detecting stresses whose magnitudes are greater than those of the stresses that can be detected by the known sensor.

The ceramic hollow member may preferably be a cylindrical member having a cylindrical wall. In this case, two resistors may be disposed on the cylindrical wall such that the two resistors are opposed to each other in a diametric direction of the cylindrical wall.

It is noted that the ceramic hollow member may more or less have a certain error of positioning within the housing of the sensor, in a direction perpendicular to the direction of extension of the hollow of the hollow member. In this case, the stress is not distributed evenly or uniformly on the ceramic hollow member in the direction perpendicular to the direction of extension of the hollow, since the hollow member is misaligned with respect to the nominal position. Consequently, the change of the resistance value of the resistor or resistors due to the stress applied to the hollow member may include an error due to the uneven stress distribution on the hollow member. If, for example, the two resistors are disposed at the diametrically opposed positions of the cylindrical hollow member, as described above, the resistance value of one of the two resistors change by a same amount but in the opposite directions, due to the misalignment of the ceramic hollow member. In other words, a decrease in the amount of change in the resistance value of one of the two resistors due to the misalignment of the hollow member is compensated for by an increase in the amount of change in the resistance value of the other resistor. Accordingly, the sum of changes in the resistance values of the two resistors is made constant, irrespective of the misalignment of the ceramic hollow member, provided that the stress to be measured is constant. Thus, the use of the cylindrical ceramic hollow member and the resistors disposed as described above permits accurate detection of the stress, with a minimum error of detection of the sensor due to the misalignment of the hollow member from the nominal position in the radial direction. This arrangement therefore provides a comparatively large tolerance of positioning of the ceramic hollow member (cylindrical hollow member) in the radial direction, and therefore permits easy radial positioning of the hollow member.

However, the ceramic hollow member may take other forms such as elliptical or polygonal shapes in cross section taken in a plane perpendicular to the direction of extension of the hollow. For instance, the ceramic hollow member may be a rectangular hollow member having a rectangular shape in transverse cross section.

The pair of support members may be adapted such that one of the pair of support members is formed as an integral part of the ceramic hollow member, while the other support member is secured to the ceramic hollow member. Alternatively, the pair of support members may be both secured to the ceramic hollow members.

Each above-indicated resistor may take the form of a substantially rectangular strip, or a circumferential strip formed in a circumferential direction of the ceramic hollow member.

The present stress sensor may comprise a diaphragm which is exposed directly to the stress. The diaphragm is deformable by the stress so as to impart the stress to the ceramic hollow member through one of the pair of support members.

Preferably, the stress sensor may further comprise a temperature compensating member disposed such that the stress is imparted to the ceramic hollow member through the temperature compensating member. The temperature compensating member has a coefficient of thermal expansion so as to reduce an influence of a temperature variation of the sensor on an output of the sensor.

The stress sensor is retained in a suitable housing. The sensor may comprise a socket received in the housing and having a recess. In this case, one of the pair of support members is accommodated in the recess in abutting contact with a bottom wall of the recess such that the above-indicated one support member is forced against the bottom wall by the stress which is applied to the ceramic hollow member through the other support member. In this case, the sensor may further comprise biasing means for biasing the socket in a direction from the one support member toward the other support member such that a biasing force is received by the housing. The ceramic hollow member may be formed with a plurality of electric terminals connected to the resistor or resistors, and a plurality of connectors are provided for connection with the respective electric terminals, so as to provide an output signal indicative of the stress. The connectors may be received in the socket so as to be pressed into contact with the respective electric terminals.

BRIEF DESCRIPTION OF THE DRAWINGS

The above and other objects, features and advantages of the present invention will be readily appreciated by reading the following description of presently preferred embodiments of the invention, when considered in connection with the accompanying drawings, in which.

DETAILED DESCRIPTION OF THE PREFERRED EMBODIMENTS

Figure 1:
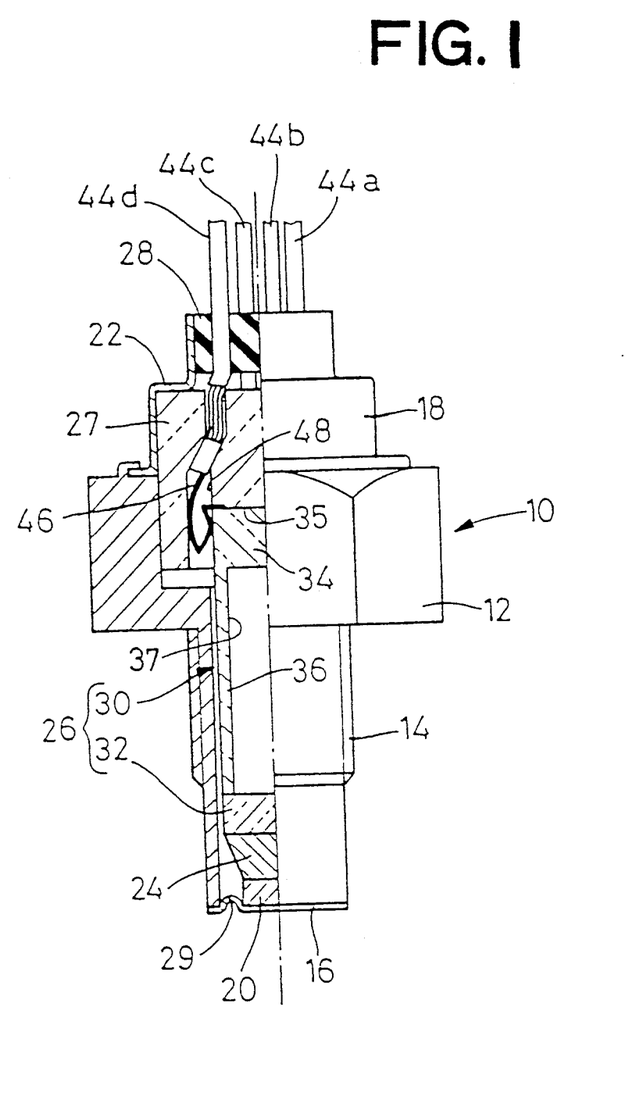
FIG. 1 is an elevational view partly in longitudinal cross section of one embodiment of a stress sensor of the invention in the form of a pressure sensor.

Referring first to FIG. 1, reference numeral 10 designates a housing of a strain sensor in the form of a pressure sensor. The housing 10 is a generally cylindrical member having a hexagonal head portion 12 and an externally threaded portion 14. These head and threaded portions 12, 14 are formed as integral parts of the housing, so that the pressure detector may be attached, at the threaded portion 14, with a suitable tool engaging the head portion 12, to a wall of an appropriate member, for example, to a cylinder wall of an internal combustion engine.

The housing 10 has an elastically deformable metallic diaphragm 16 disposed so as to gas-tightly close its distal end remote from the threaded portion 14. The upper open end of the housing 10 on the side of the head portion 12 is closed by a stepped-diameter cap portion 18. The cap portion 18 has a small-diameter section remote from the head portion 12, and a large-diameter section gas-tightly secured by caulking to the head portion 12 such that the cap portion 18 is coaxial with the head and threaded portions 12, 14 and the diaphragm 16.

The pressure sensor includes a disk-shaped metallic relay member 20, a temperature compensating member 24, a stress detecting element 26, and a socket 27, which are all accommodated within the assembly of the housing 10 and the cap portion 18. More specifically, the disk-shaped relay member 20 is fixed to the diaphragm 16, such that the relay member and diaphragm 20, 16 are coaxial with each other. The socket 27 is partially received in the large-diameter section of the cylindrical cap portion 18, with one end face of the socket 27 held in abutting contact with a shoulder 22 of the cap portion 18. Between the socket 27 and the relay member 20, there are interposed the temperature compensating member 24 and the stress detecting element 26 such that the temperature compensating member 24 is in contact with the relay member 20 and the stress detecting element 26, while the element 26 is in contact with the socket 27.

The small-diameter section of the cap portion 18 is gas-tightly filled by a heat-resistant rubber plug 28. The diaphragm 16 is formed with an annular projection 29 which protrudes so as to surround the periphery of the disk-shaped relay member 20, as shown in FIG. 1, so that the relay member 20 is fixed in position in the radial direction. In the above arrangement, the relay member 20 is translated in its axial direction, namely, in the axial direction of the housing 10, when the diaphragm 16 is exposed to a stress in the form of a pressure to be detected.

The stress detecting element 26 consists of a cylinder member 30 and a disk member 32 which are formed of ceramic materials and which have a same diameter. The cylinder member 30 consists of a bottom wall portion 34 in contact with the socket 27, and a hollow member in the form of a cylindrical wall portion 36 which is closed at one end thereof by the bottom wall portion 34. The cylindrical wall 36 has a cylindrical hollow 37 defined by its inner circumferential surface. The open end of the cylindrical wall portion 36 is closed by the disk member 32, such that the disk member 32 is secured at its peripheral portion to the annular end face of the cylindrical wall portion 36 and is in contact with the temperature compensating member 24.

Thus, the stress detecting element 26 is sandwiched by and between the temperature compensating member 24 and the socket 27, such that the temperature compensating member 24 is sandwiched by and between the disk member 32 of the detecting element 26 and the relay member 20 secured to the diaphragm 16, while the socket 27 is sandwiched by and between the shoulder 22 of the cap portion 18 and the bottom wall portion 34 of the detecting element 26. When a pressure is applied to the diaphragm 16, the pressure is transmitted to the cylindrical wall portion 36 of the cylinder member 30 of the stress detecting element 26, through the relay member 20, temperature compensating member 24 and disk member 32. As a result, the cylindrical wall portion 36 undergoes compressive deformation in its axial direction, by an amount which varies depending upon the level of the pressure to which the diaphragm 16 is exposed for measurement.

The disk member 32 and the bottom wall portion 34 of the cylinder member 30 of the stress detecting element 26 have thicknesses large enough to substantially prevent these members and portion 32, 34 from being deformed due to the pressure applied to the diaphragm 16, so that the cylindrical wall portion 36 of the cylinder member 30 may be deformed in its axial direction, as a function of the pressure applied to the diaphragm 16. The socket 27 has a recess 35 in which the cylinder member 30 is partially accommodated such that the end face of the bottom wall portion 34 remote from the cylindrical wall portion 36 is in abutting contact with the bottom surface of the recess 35.

The temperature compensating member 24 interposed between the disk member 32 of the detecting element 26 and the relay member 20 is formed of a suitable material such as aluminum or aluminum alloy, which has a high coefficient of thermal expansion. The thickness or axial dimension of the temperature compensating member 24 is determined such that the total amount of variation due to a temperature change in the axial dimensions of the temperature compensating member 24, detecting element 26, socket 27 and relay member 20 is substantially equal to the amount of variation in the axial dimension of the housing 10 due to the temperature change. Thus, the temperature compensating member 24 minimizes a variation due to the temperature change, in the amount of force which acts on the stress detecting element 26 for holding the element 26 in position in the axial direction. This permits the amount of compressive deformation or strain of the cylindrical wall portion 36 to vary so as to accurately reflect the level of the pressure which acts on the wall 36 via the diaphragm 16.

It is noted that the elastically deformable diaphragm 16 absorbs a slight difference between the total amount of variation due to a temperature change in the axial dimensions of the compensating member 24, detecting element 26, socket 27 and relay member 20, and the corresponding amount of variation in the axial dimension of the housing 10.

The temperature compensating member 24 has a truncated conical shape, with a small-diameter end face having the same diameter as that of the relay member 20, and a large-diameter end face having the same diameter as that of the disk member 32 of the stress detecting element 26. The small-diameter end face of the member 24 is coaxially secured to the relay member 20, while the large-diameter end face is in contact and coaxial relation with the disk member 32. In this arrangement, the pressure applied to the diaphragm 16 may be exerted on the disk member 32 of the detecting element 26, with uniform surface pressure distribution on the disk member 32, whereby the pressure to be sensed may act on the cylindrical wall portion 36 of the cylinder member 30, evenly over the entire circumferential portion of the wall 36.

Figure 2:
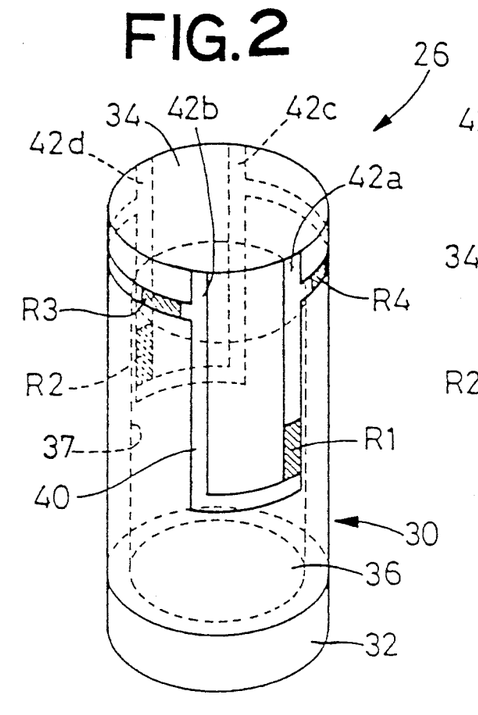
FIG. 2 is a perspective view of a stress detecting element used in the pressure sensor of FIG. 1.
Figure 3:
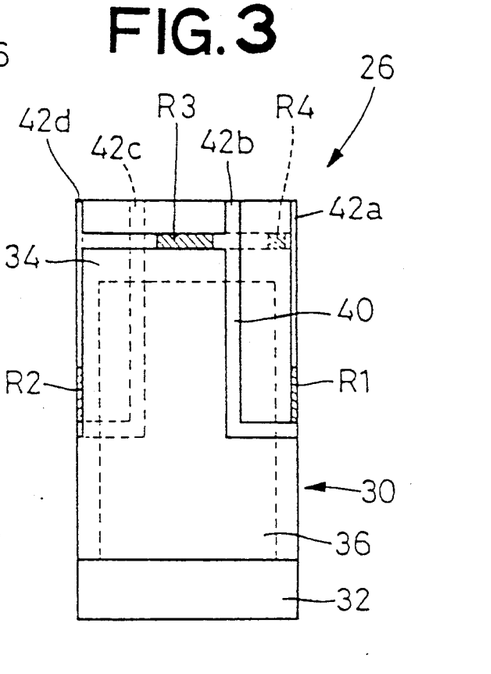
FIG. 3 is an elevational view of the stress detecting element of FIG. 2.

Referring next to FIGS. 2 and 3, the cylindrical wall portion 36 which undergoes compressive deformation due to the pressure applied through the diaphragm 16 has a pair of resistors R1 and R2 in the form of strip-like films formed on its outer circumferential surface. More specifically, the resistors R1 and R2 are formed on the axially intermediate portion of the outer circumferential surface of the cylindrical wall portion 36, such that the resistors R1, R2 are opposed to each other in the diametric direction of the all 36. Further, a pair of resistors R3 and R4 in the form of strip-like films are formed on an axial end portion of the outer circumferential surface of the cylinder member 30, namely, on the outer circumferential surface of the bottom wall portion 34. The cylinder member 30 has conductors 40 in the form of strips which electrically connect the resistors R1, R2, R3 and R4, so as to form a Wheatstone bridge circuit 38, as indicated in FIG. 4.

Figure 4:
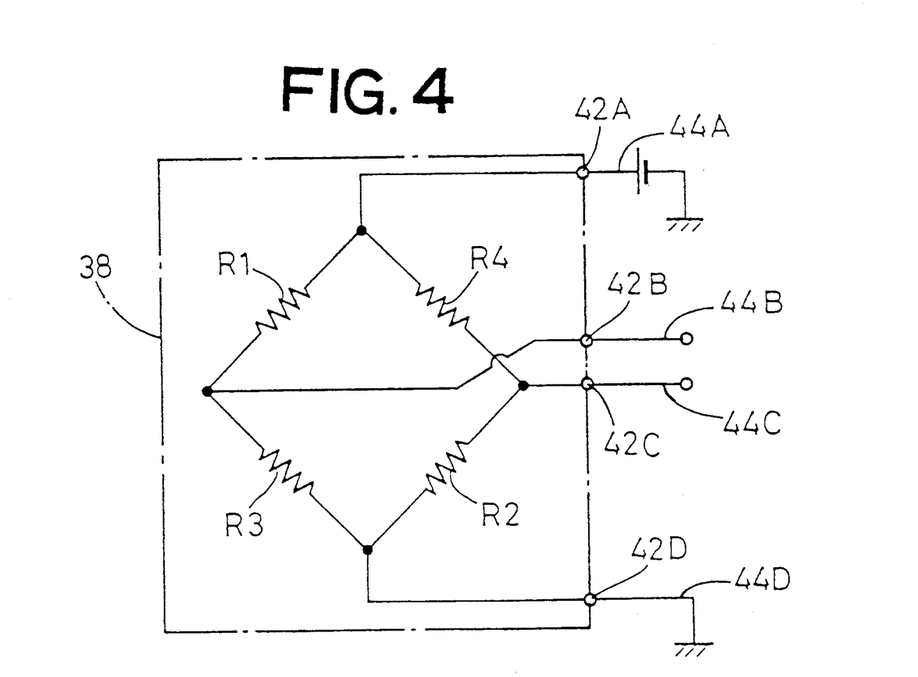
FIG. 4 is a diagram illustrating a bridge circuit incorporating resistors provided on the stress detecting element, for detecting the amount of a stress in the form of a pressure applied to the sensor, depending upon a variation in the electrical resistances of the resistors.

The bridge circuit 38 of FIG. 4 has electrical connections 42A, 42B, 42C and 42D for connection with an external circuit, as indicated in FIG. 4. These connections are provided by electrical terminals 42a, 42b, 42c and 42d, which are formed by appropriate terminal portions of the conductors 40, such that the terminals extend in the axial direction of the cylinder member 30, up to the end face of the bottom wall portion 34. With the bottom wall portion 34 of the cylinder member 30 received in the recess 35 formed in the socket 27, the terminals 42a, 42b, 42c and 42d are connected to respective lead wires 44a, 44b, 44c and 44d (corresponding to signal lines 44A, 44B, 44C and 44D as indicated in FIG. 4), through respective connectors 46 disposed in the electrically insulating socket 27, as shown in FIG. 1.

Described in detail, the insulating socket 27 has four through-holes 48 (one of which is shown in FIG. 1) formed therethrough in the axial direction of the housing 10. The four through-holes 48 are spaced from each other in the circumferential direction of the housing 10, in aligned relation with the terminals 42a, 42b, 42c and 42d of the conductors 40. The four connectors 46 caulked to the respective lead wires 44a, 44b, 44c and 44d are fixedly received in the respective through-holes 48, such that the connectors 46 are held in elastically pressing contact with the respective terminals 42a–42d. To this end, the cylinder member 30 is circumferentially positioned relative to the socket 27, with its bottom wall portion 34 inserted in the recess 35, so that the four terminals 42a–42d are aligned with the respective four through-holes 48 in the circumferential direction of the cylinder member 30.

The lead wires 44a–44d extend from the through-holes 48 of the socket 27, outwardly of the housing 10 through the rubber plug 28, so as to server as the signal lines 44A, 44B, 44C and 44D, as indicated in FIG. 4. In operation of the present pressure sensor, a reference voltage is applied between the lead wires 44a and 44d (signal lines 44A and 44D), and the amount of variation in the resistance values of the resistors R1, R2 is sensed as an output signal produced between the lead wires 44b and 44c, whereby the pressure which acts on the stress detecting element 26 via the diaphragm 16 is sensed.

The resistors R1, R2 are deformed according to compressive deformation of the cylindrical wall portion 36 of the cylinder member 30. Accordingly, the resistance values of the resistors R1, R2 vary (decrease) with a variation in the level of pressure to be measured as a stress which acts on the sensor. However, the resistance values of the resistors R3 and R4 do not change with the pressure to be sensed, since the bottom wall portion 34 on which the resistors R3 and R4 are formed undergoes substantially no deformation.

In the present pressure sensor adapted to measure a pressure, the pressure applied to the elastically deformable diaphragm 16 is imparted to the cylindrical wall portion 36 of the cylinder member 30 of the stress detecting element 26, through the relay member 20, temperature compensating member 24, and the disk member 32 of the stress detecting element 26. The cylindrical wall portion 36 of the cylinder member 30 is axially deformed due to a compressive stress, by an amount which varies with the level of the pressure applied. As a result, the electrical resistance values of the resistors R1 and R2 decrease with the amount of compressive deformation of the cylindrical wall portion 36, whereby the level of the output signal produced between the lead wires 44b and 44c changes with the amount of compressive deformation of the cylindrical wall portion 36. Therefore, the level of the output signal between the lead wires 42b, 42c represents the amount of decrease in the electrical resistance values of the resistors R1, R2, and consequently represents the amount of compressive deformation of the cylindrical wall portion 36, i.e., the level of the pressure which causes the compressive deformation. Thus, the pressure acting on the diaphragm 16 may be measured.

It will be understood from the above explanation that the cylindrical wall portion 36 of the cylinder member 30 of the stress detecting element 26 constitutes a ceramic hollow member serving as a substrate which bears the resistors R1, R2, while the bottom wall portion 34 of the cylinder member 30 and the disk member 32 which cooperates with the cylinder member 30 to form the stress detecting element 26 serve as a pair of support members for supporting the ceramic hollow member 36.

In the present pressure sensor, the disphragm 16 is exposed directly to the atmosphere or fluid whose pressure is to be measured, and the ceramic hollow substrate member in the form of the cylindrical wall portion 36 of the cylinder member 30 is thermally insulated or isolated from the subject atmosphere or fluid. Therefore, the cylindrical wall portion 36 as the ceramic hollow substrate member is protected against a sudden change in the temperature of the subject atmosphere, as in the case of the atmosphere within an internal combustion engine, whose temperature tends to frequently vary to a considerable degree. Accordingly, the amount of variation in the temperature of the cylindrical wall portion 36 is significantly reduced as compared with that of the subject atmosphere. Therefore, the cylindrical wall portion 36 as the ceramic hollow substrate member suffers from an extremely reduced difference in temperature between its local portions, whereby the amount of thermal stress of the wall 36 due to the temperature difference, and the amount of deformation of the wall 36 caused by the thermal stress may be effectively minimized, as compared with those of a conventional substrate in the form of a ceramic substrate used in a known pressure sensor. Thus, the present pressure sensor assures accurate and reliable measurement of the pressure of the subject atmosphere, with a remarkably reduced measuring error arising from the fluctuating temperature of the subject atmosphere, as compared with the measuring error encountered in the known pressure sensor with the ceramic diaphragm.

In the present pressure sensor, the cylindrical wall portion 36 of the cylinder member 30 as the ceramic hollow substrate member undergoes only the compressive deformation in the axial direction due to the pressure applied thereto, and therefore provides significantly increased durability, as compared with that of the known pressure sensor using a ceramic diaphragm as the substrate, which undergoes both compressive deformation and tensile deformation. The increased durability means that the instant pressure sensor may deal with the atmosphere or fluid whose pressure is comparatively higher than that of the subject atmosphere of the known pressure sensor.

Further, the ceramic hollow substrate 36 as the ceramic substrate for supporting the resistors R1, R2 takes the form of a hollow cylinder, and the resistors R1, R2 whose resistance values vary due to the deformation of the hollow cylinder or cylindrical wall portion 36 are disposed at the diametrically opposed positions on the outer circumferential surface of the ceramic hollow substrate 36. This arrangement minimizes a measuring error of the present pressure sensor, even if the ceramic hollow substrate 36 is more or less misaligned in the radial direction upon assembling of the stress detecting element 26 relative to the other components of the sensor. Namely, an uneven distribution of the subject pressure (applied through the diaphragm 16) in the radial direction of the cylindrical wall portion 36 due to the assembly error will not cause a measuring error, because the resistance values of the resistors R1 and R2 deviate from the nominal values by the same amount in the opposite directions, if there exists a certain amount of radial misalignment of the cylindrical wall 36. This means a comparatively large tolerance of the assembling accuracy, which means comparatively easy assembling of the pressure sensor.

Figure 5:
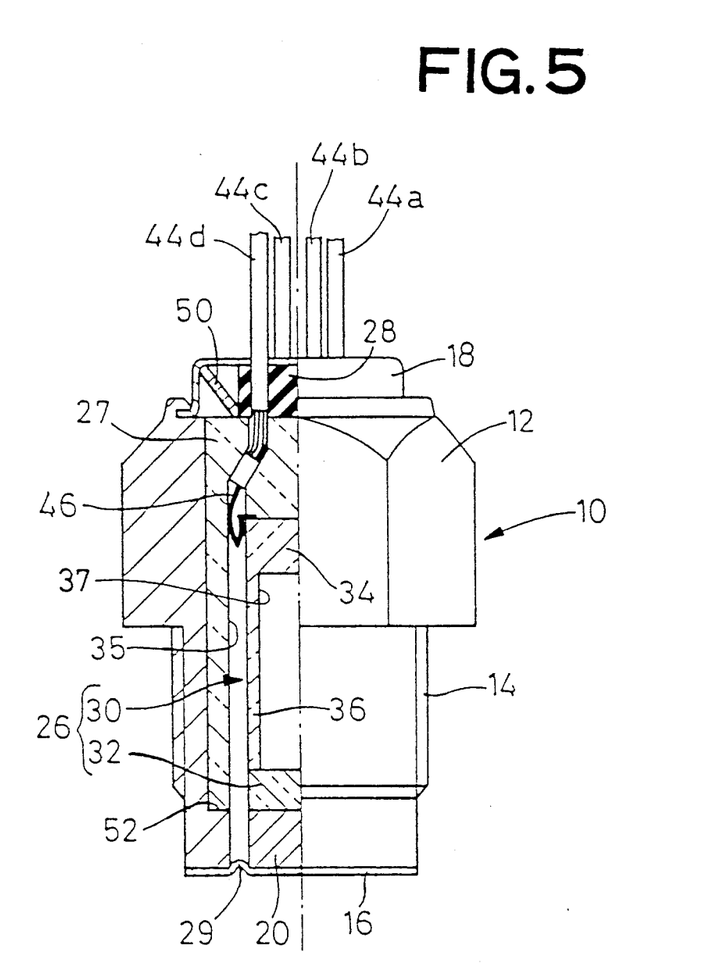
FIG. 5 is a view corresponding to that of FIG. 1, showing another of the pressure sensor according to the invention.

Referring next to FIG. 5, there will be another embodiment of the stress sensor of the present invention also in the form of a pressure sensor. In the interest of brevity and simplification, same reference numerals as used in the preceding embodiment will be used in the present embodiment, to identify the functionally equivalent components, and no redundant description of these components will be described.

In the pressure sensor shown in FIG. 5, an annular coned-disk or belleville spring 50 is interposed between the insulating socket 27 and the cap portion 18, such that the spring 50 surrounds the rubber plug 28 through which the lead wires 44a-44d extend. This coned-disk spring 50 biases the socket 27 in the axial direction toward the diaphragm 16. In the present embodiment, the recess 35 formed in the socket 27 has a relatively large axial dimension, and the housing 10 has an annular shoulder surface 52 formed at its end portion adjacent the diaphragm 16. Under the biasing action of the spring 50, the face of the open end of the socket 27 is held in abutting contact with the shoulder surface 52, irrespective of a variation in the ambient temperature.

The axial length of the recess 35 of the socket 27 is substantially equal to the axial length of the stress detecting element 26, so that the element 26 is accommodated in the recess 35 over the substantially entire length. The relay member 20 secured to the inner surface of the diaphragm 16 is held in direct abutting contact with the end face of the detecting element 26, without a temperature compensating member interposed therebetween.

In the present embodiment, the amount of variation due to a temperature change in the axial dimension of the detecting element 26 is almost equal to that of the cylindrical wall portion of the socket 27 which defines the recess 35. Accordingly, the force by which the detecting element 26 is sandwiched in the axial direction between the socket 27 and the relay member 20 may be kept substantially constant irrespective of the varying ambient temperature, provided that the relay member 20 is formed of a material whose coefficient of thermal expansion is almost equal to that of the housing 10. Thus, the instant arrangement provides a similar effect as provided by the temperature compensating member 24 used in the preceding embodiment. That is, the measuring error which arises from different thermal expansion coefficients of the components of the sensor may be effectively minimized.

The present modified pressure sensor of FIG. 5 provides the same advantages as provided by the embodiment of FIG. 1, over the conventional pressure sensor using the ceramic diaphragm as the substrate for the resistors, in terms of the freedom from an influence of the measuring accuracy by a sudden change of the temperature of the subject atmosphere, and in terms of the durability and the pressure level of the subject atmosphere.

Figure 6:
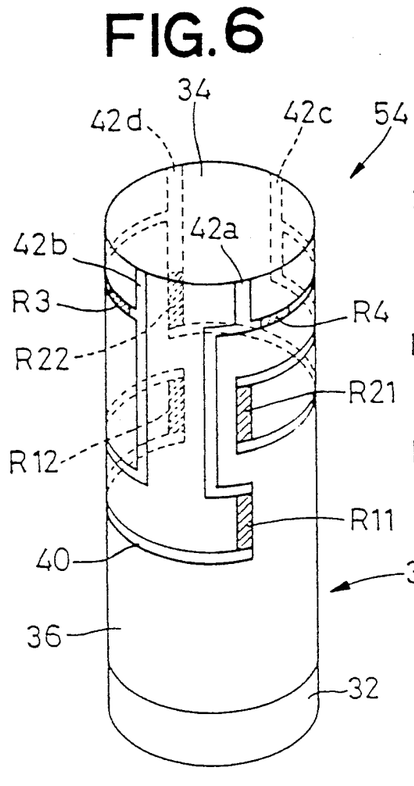
FIGS. 6, 7 and 8 are views corresponding to FIGS. 2, 3 and 4, respectively, showing further embodiments of the invention.
Figure 7:
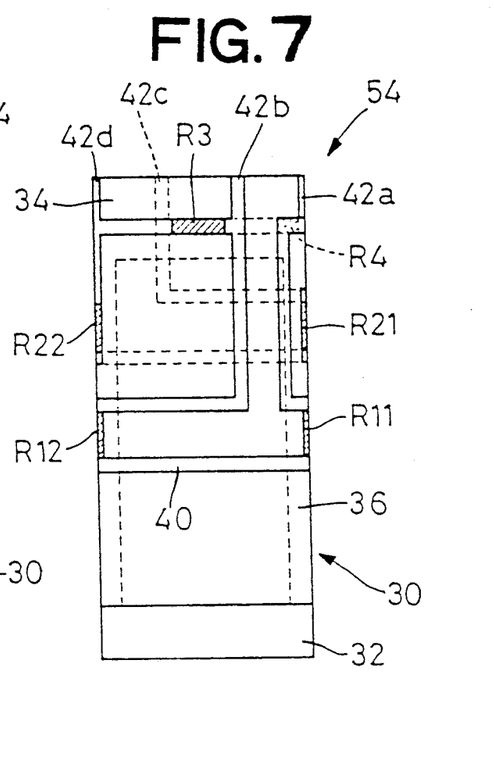

Reference is now made to FIGS. 6 and 7, which show a modified form of stress detecting element that may be substituted for the element 26 illustrated in FIGS. 2 and 3.

Figure 8:
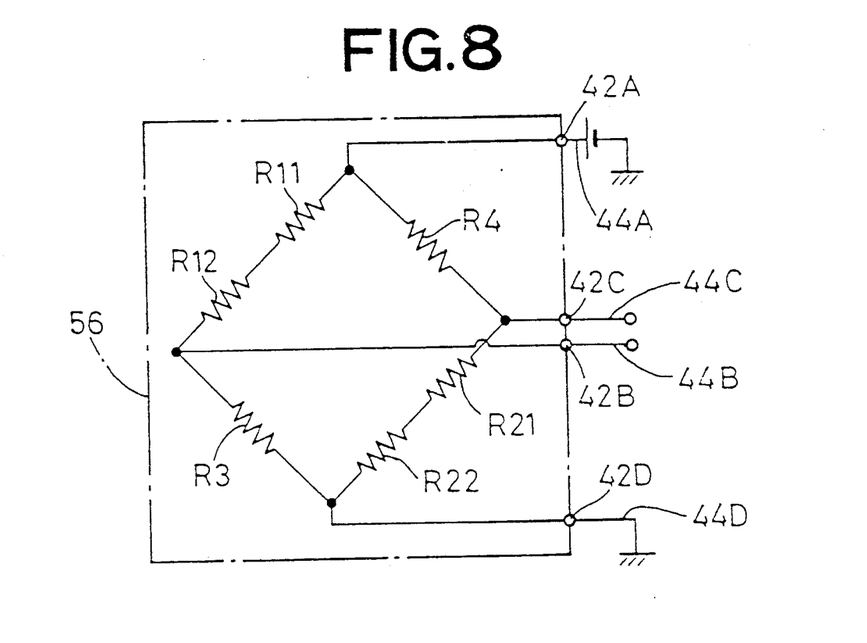

In FIGS. 6 and 7, the stress detecting element is indicated generally at 54. Like the detecting element 26 used in the preceding embodiments, the detecting element 54 consists of the cylinder member 30 and the disk member 32 which are secured to each other as an integral body. However, the cylindrical wall portion 36 of the cylinder member 30 has two pairs of resistors R11, R12, and R21, R22 formed on its outer circumferential surface. The resistors R11 and R12 are opposed to each other in the diametric direction of the cylindrical wall portion 36, while the resistors R21 and R22 are opposed to each other in the diametric direction. Further, the cylinder member 30 has the resistors R3 and R4 formed on the circumferential surface of the bottom wall portion 34, as in the preceding embodiments. The conductors 40 are formed for connecting these resistors R11, R12, R21, R22, R3 and R4, so as to form a Wheatstone bridge circuit indicated at 56 in FIG. 8.

As is seen from FIG. 6, the resistors R11 and R21 are positioned at the same circumferential position of the cylindrical wall 36, while the resistor R12 and R22 are positioned at the same angular position. The terminals 42a, 42b, 42c, 42d of the conductors 40, which correspond to the connections 42A, 42B, 42C, 42D of the Wheatstone bridge circuit 56 of FIG. 8 to the external circuit, extend up to the end face of the bottom wall portion 34 of the cylinder member 30, as in the stress detecting element 26 of the preceding embodiments.

While the embodiments of the present invention in the form of a pressure sensor have been described above, the principle of the invention is widely applicable to various types of stress sensors other than the pressure sensor. The stress detecting elements 26, 54 used in the above embodiments may be used in any forms of stress sensors, but the stress sensors according to the invention may employ stress detecting elements which have various modified structures as illustrated in FIGS. 9, 11, 13, 15 and 17, depending upon the kind of the stress to be sensed, and the manner in which the stress sensor is used. The stress sensors using the stress detecting elements as shown in the figures indicated above may achieve the object of the present invention, with different degrees of effects. These stress detecting elements may be used for the pressure sensors according to the embodiments of FIGS. 1–8, while these pressure sensors may be used for sensing stresses other than the pressure.

The structures of the modified stress detecting elements will be described.

Figure 9:
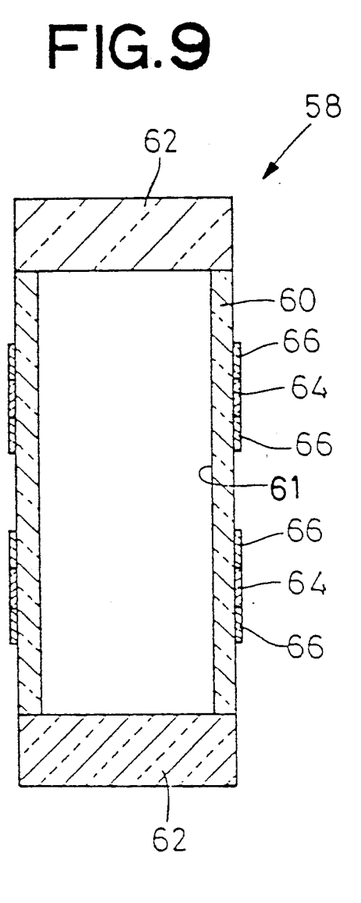
FIGS. 9, 11, 13, 15 and 17 are elevational views in longitudinal cross section, respectively showing stress detecting elements used in still further embodiments of the invention.
Figure 10:
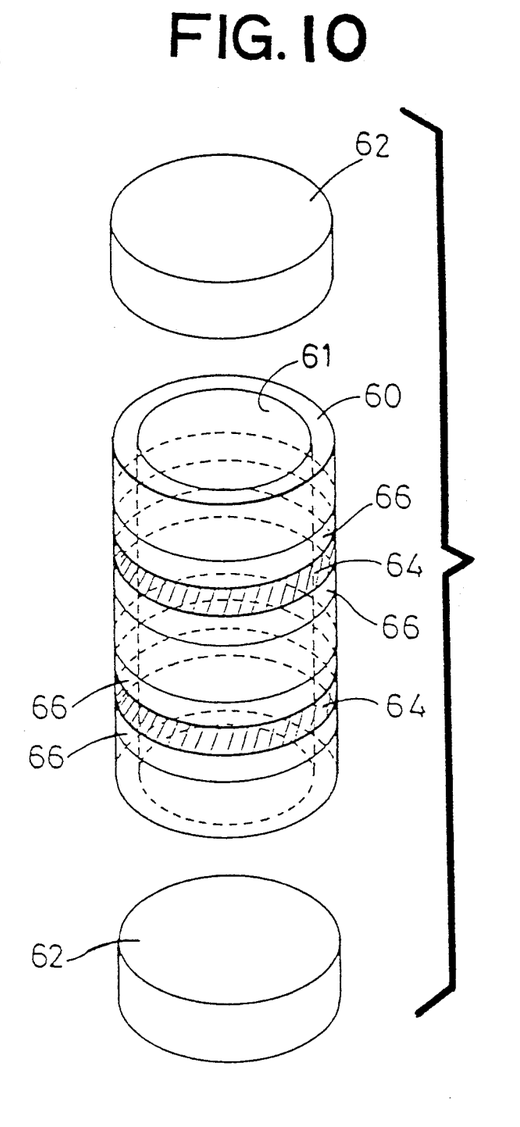
FIGS. 10, 12, 14, 16 and 18 are exploded perspective views of the stress detecting elements of FIGS. 9, 11, 13, 15 and 17, respectively.

In FIG. 9, a stress detecting element is indicated generally at 58. As shown also in FIG. 10, this detecting element 58 consists of a ceramic hollow member (ceramic substrate) in the form of a cylindrical member 60, and a pair of support members in the form of a pair of ceramic disk members 62, 62 which support the cylindrical member 60. The cylindrical member 60 has a cylindrical hollow 61 defined by its inner circumferential surface. The disk members 62, 62 have the same diameter as the cylindrical member 60, and are coaxially secured to the opposite annular end faces of the cylindrical member 60. As shown in FIGS. 9 and 10, two resistors 64 in the form of circumferential strips having a suitable width are formed in an axially intermediate portion of the outer circumferential surface of the cylindrical member 60, such that the two resistors 64 are spaced apart from each other by a suitable distance in the axial direction of the cylindrical member 60. On the opposite sides of each resistor 64 in the axial direction of the cylindrical member 60, there are formed two conductors 66 also in the form of circumferential strips. The resistance values of the two resistors 64 are detected through the conductors 66.

In a stress sensor using the stress detecting element 58, the stress exerted on the cylindrical member 60 through the disk members 62 may be sensed based on a change in the electrical resistance of at least one of the two resistors 64.

Since the resistors 64 are provided on the cylindrical member 60 and formed over the entire circumference of the cylindrical member 60, the stress detecting error may be held to a minimum, even if the stress distribution on the cylindrical member 60 is not even or uniform in the radial direction due to radial misalignment of the cylindrical member 60.

Figure 11:
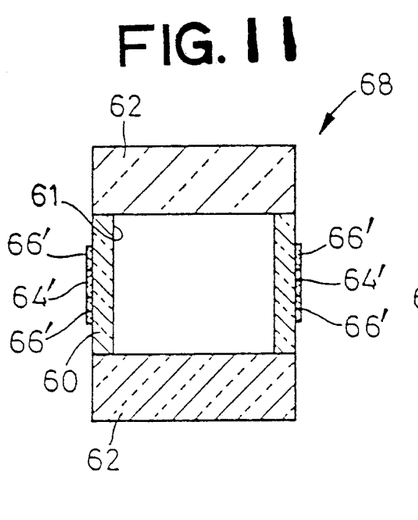
Figure 12:
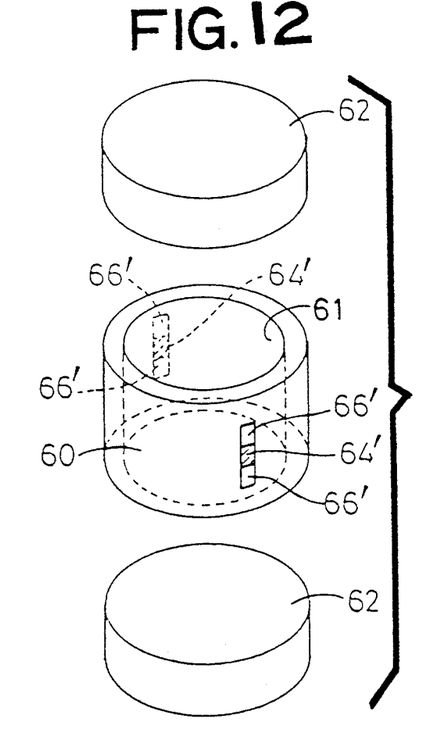

Like the stress detecting element 58 of FIG. 9, a stress detecting element 68 shown in FIG. 11 consists of the ceramic cylindrical member 60, and the pair ceramic disk members 62 integrally secured to the opposite ends of the cylindrical member 60. As also shown in FIG. 12, a pair of resistors 64' in the form of substantially square segments are formed on the outer circumferential surface of the cylindrical member 60, in opposed relation with each other in the diametric direction of the member 60. On the opposite sides of each resistor 64' in the axial direction of the cylindrical member 60, a pair of conductors 66' in the form of substantially square segments are formed.

In a stress sensor using the stress detecting element 68, the stress exerted on the cylindrical member 60 through the disk members 62 may be sensed based on a change in the electrical resistance of at least one of the two resistors 64'. Further, the stress detecting error due to radial misalignment of the cylindrical member 60 may be held to a minimum, provided that the detecting is effected based on the resistance values of the two resistors 64', as in the pressure sensors of the preceding embodiments using the detecting element 26, 54.

In the stress sensor using the detecting element 68, too, a Wheatstone bridge circuit incorporating the resistors 64' is formed so as to detect the resistance values of these resistors 64', as in the pressure sensors of the preceding embodiments.

Figure 13:
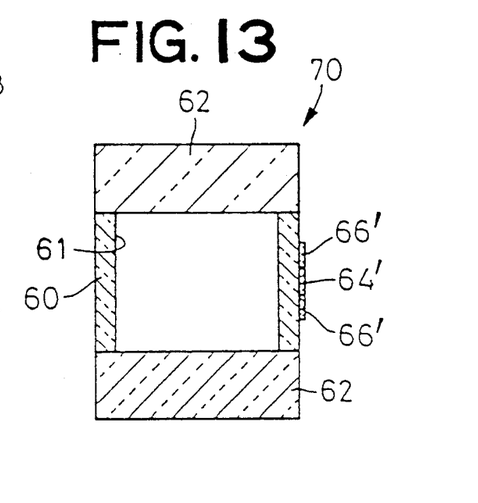
Figure 14:
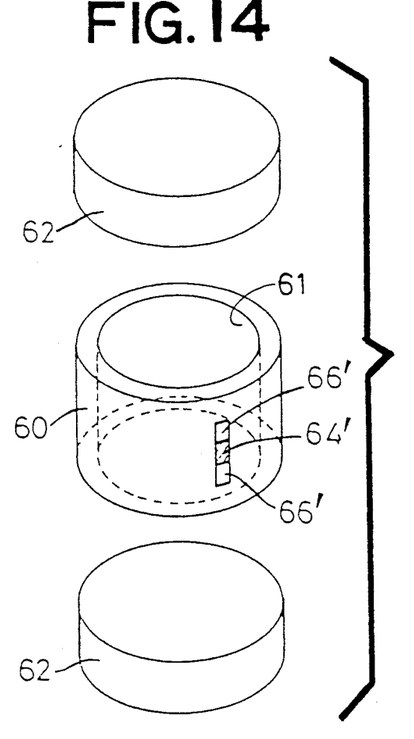

A stress detecting element 70 shown in FIGS. 13 and 14 has only one resistor 64' and only one pair of conductors 66', unlike the detecting element 68 of FIGS. 11 and 12. A stress detecting element 72 of FIGS. 15 and 16 is identical with the detecting element 70 of FIGS. 13 and 14, except that the cylinder member 30 as used in the embodiments of FIGS. 1 and 5 is used in place of the cylindrical member 60 and one of the disk members 62 of FIGS. 13 and 14.

Figure 15:
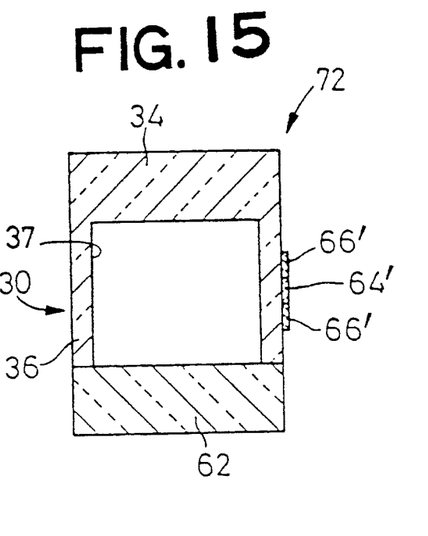
Figure 16:
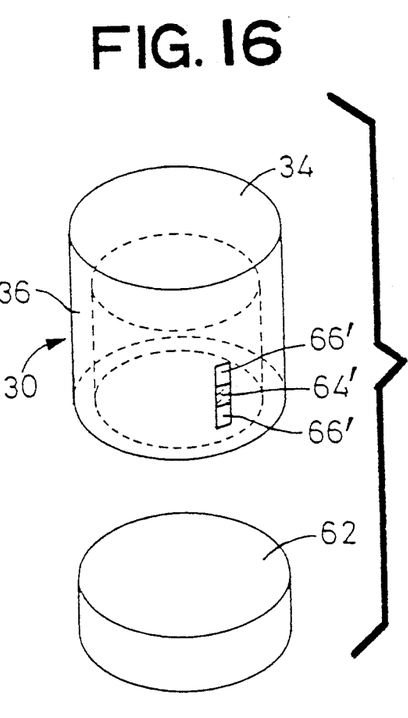

The stress detecting elements 70, 72 of FIGS. 13–14 and FIGS. 14–15 are also capable of detecting the amount of a stress axially applied to the cylindrical member 60 or cylinder member 30, based on the resistance value of the resistor 64'. The resistance value or values of the resistor 64' of the detecting element 70, 72 is generally detected by means of a Wheatstone bridge circuit.

While the present invention has been described in detail in its presently preferred embodiments, for illustrative purpose only, it is to be understood that the invention is not limited to the details of the illustrated embodiments, but may be embodied with various changes, modifications and improvements, which may occur to those skilled in the art, without departing from the spirit of the invention.

In the illustrated embodiments, the ceramic hollow member used as the substrate for supporting the resistor or resistors, and the pair of support members for supporting the ceramic hollow member are formed as an integral body or integrally secured to each other. However, the ceramic hollow member and the support members need not be secured to each other or an integral body, provided that the separate ceramic hollow member and support members can be held in position in abutting contact with each other. In this case, however, the abutting surfaces of the hollow member and the support members should be mirror-polished, in order to avoid a variation in the pressure acting on the ceramic hollow member, which would otherwise arise from deformation or collapse of minute projections and depressions on the abutting surfaces, or from frictional sliding of the abutting surfaces due to such projections and depressions.

While the ceramic hollow members 36, 60 as the ceramic substrate of the stress detecting elements 26, 54, 58, 68, 70 and 72 of the illustrated embodiments are all cylindrical hollow members, the detecting element may use a ceramic hollow member which has other shapes such as polygonal or elliptical hollow shapes.

Figure 17:
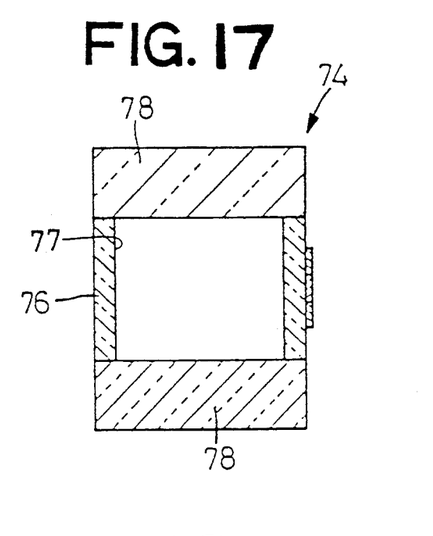
Figure 18:
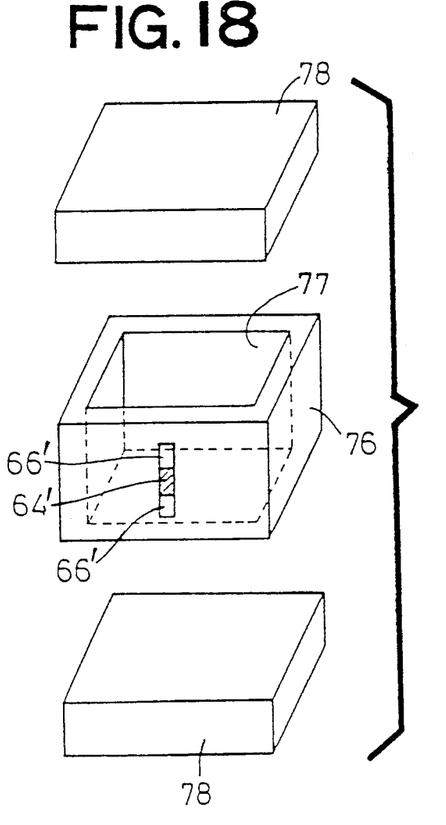

An example of the stress detecting element using a polygonal ceramic hollow member is illustrated in FIGS. 17 and 18. More specifically, the detecting element indicated at 74 in FIG. 17 consists of a rectangular ceramic hollow member 76 having a rectangular hollow 77 having a square transverse cross sectional shape, and a pair of square ceramic plates 78, 78 having the same cross sectional size as that of the rectangular hollow member 76. The square ceramic plates 78 are integrally secured to the opposite ends of the hollow member 76. A substantially square resistor 64' and two substantially square conductors 66' (which are similar to those of the detecting element 70 of FIGS. 13 and 14) are formed on one of four side surfaces of the hollow member 76.

In the stress detecting element 74 constructed as described above, the stress applied to the rectangular ceramic hollow member 76 in the direction parallel to the side surfaces may be detected, based on a change in the resistance value of the resistor 64'.

Since the resistor 64' and the conductors 66' of the detecting element 74 of FIGS. 17 and 18 are provided on the flat surface of the hollow member 76, these resistor and conductors 66', 66' may be easily formed by a printing method such as a screen printing technique.

However, it is desirable to use a cylindrical ceramic hollow member which has at least one pair of resistors diametrically opposed to each other, as used in the stress detecting elements 26, 54, 58, 68 of FIGS. 1, 6, 9 and 11, for minimizing the stress detecting error due to uneven distribution of a stress on the ceramic hollow member in the radiation direction, which may be caused when the ceramic hollow member is misaligned in the radial direction, as described above.

Although the resistor or resistors is/are formed on only the outer surface of the ceramic hollow member in the illustrated embodiments, the resistor or resistors may be formed on only the inner surface of the ceramic hollow member. Further, the resistors may be formed on both outer and inner surfaces of the ceramic hollow member.

It is also noted that the support members for supporting the ceramic hollow member need not be formed of a ceramic material, but one or both of the support members may be formed of a metallic material.

What is claimed is:

1. A stress sensor for detecting a stress, comprising:
   a housing;
   a hollow ceramic member disposed in said housing and having an inner and an outer surface and a hollow portion defined by said inner surface, said ceramic member being deformable according to a stress applied thereto in a direction in which said hollow portion extends;
   a pair of support members accommodated in said housing and disposed at opposite ends of said ceramic member, so as to support said ceramic member in said direction, through a first of said pair of support members;
   at least one resistor provided on at least one of said inner surface and said outer surface, an electrical resistance value of said at least one resistor varying with an amount of deformation of said ceramic member, said stress being detected based on a change in said electrical resistance value of at least one resistor;
   a socket disposed in said housing and including a cylindrical wall defining an axial portion of a recess and a bottom wall defining an end portion of the recess, the second of said pair of support members being accommodated in the recess in abutting contact with said bottom wall such that said second support member is forced against said bottom wall by said stress applied to said ceramic member through said first support member; and
   means for biasing said socket in a direction from said second support member toward said first support member such that a biasing force exerted by said biasing means is received by said housing;
   wherein said cylindrical wall has an axial length and a coefficient of thermal expansion which are substantially equal to a total axial length of said ceramic member and said pair of support members, and an average coefficient of thermal expansion of said ceramic member and said pair of support members, respectively, so as to reduce an influence of a temperature variation of the sensor on an output of the sensor.

2. The stress sensor of claim 1, wherein said at least one resistor consists of at least two resistors which include a pair of resistors which are disposed on a cylindrical wall of said ceramic member, at diametrically opposite positions of the cylindrical wall.

3. The stress sensor of claim 1, wherein said ceramic member has a rectangular shape in transverse cross section taken in a plane perpendicular to said direction.

4. The stress sensor of claim 1, wherein each of said at least one resistor has a shape of a substantially rectangular strip.

5. The stress sensor of claim 1, wherein each of said at least one resistor has a shape of a circumferential strip formed in a circumferential direction of said ceramic member.

6. The stress sensor of claim 1, further comprising a diaphragm disposed at one of said opposite ends of said ceramic member so as to be directly exposed to said stress, said diaphragm being deformable by said stress so as to impart said stress to said ceramic member through one of said pair of support members.

7. The stress sensor of claim 1, further comprising a plurality of electric terminals connected to said at least one resistor, and a plurality of connectors which are connected to said electric terminals, respectively, so as to provide an output signal indicative of said stress.

8. The stress sensor of claim 7, wherein said plurality of connectors are received in said socket so as to be pressed into contact with said respective electric terminals.

9. A stress sensor comprising:
   a ceramic member having an inner and an outer surface and a hollow portion defined by said inner surface, said ceramic member being deformable according to a stress applied thereto in a direction in which said hollow portion extends;
   a pair of support members disposed at opposite ends of said ceramic member so as to support said ceramic member in said direction such that said stress is imparted to said ceramic member in said direction through one of said pair of support members;
   at least one resistor provided on at least one of said inner surface and said outer surface, an electrical resistance value of said at least one resistor varying with an amount of deformation of said ceramic member, said stress being detected based on a change in said electrical resistance value of said at least one resistor; and
   a temperature compensating member disposed at one end of said ceramic member, said stress being transferred from said temperature compensating member to said ceramic member such that a coefficient of thermal expansion of said temperature compensating member reduces an influence of a temperature variation of the sensor on an output of the sensor.

10. The stress sensor of claim 9, wherein said at least one resistor consists of at least two resistors which include a pair of resistors which are disposed on a cylindrical wall of said ceramic member, at diametrically opposite positions of the cylindrical wall.

11. The stress sensor of claim 9, wherein said ceramic member has a rectangular shape in transverse cross section taken in a plane perpendicular to said direction.

12. The stress sensor of claim 9, wherein one of said pair of support members is formed as an integral part of said ceramic member, while the other support member is secured to said ceramic member.

13. The stress sensor of claim 9, wherein said pair of support members are secured to said ceramic member.

14. The stress sensor of claim 9, wherein each of said at least one resistor has a shape of a substantially rectangular strip.

15. The stress sensor of claim 9, wherein each of said at least one resistor has a shape of a circumferential strip formed in a circumferential direction of said ceramic member.

16. The stress sensor of claim 9, further comprising a diaphragm disposed at one of said opposite ends of said ceramic member so as to be directly exposed to said stress, said diaphragm being deformable by said stress so as to impart said stress to said ceramic member through one of said pair of support members.

17. The stress sensor of claim 9, wherein said pair of support members consist of a ceramic material.

18. The stress sensor of claim 9, further comprising a housing and a socket disposed in said housing and having a recess formed therein, one of said pair of support members being accommodated in said recess in abutting contact with a bottom wall of said socket which defines said recess, such that said one support member is forced against said bottom wall by said stress applied to said ceramic member through the other support member.

19. The stress sensor of claim 18, further comprising means for biasing said socket in a direction from said one support member toward said other support member such that a biasing force exerted by said biasing means is received by said housing.

20. The stress sensor of claim 19, further comprising a plurality of electric terminals connected to said at least one resistor, and a plurality of connectors which are connected to said electric terminals, respectively, so as to provide an output signal indicative of said stress.

21. The stress sensor of claim 20, wherein said plurality of connectors are received in said socket so as to be pressed into contact with said respective electric terminals.

* * * * *